US006848998B2

United States Patent
Bosk

(10) Patent No.: US 6,848,998 B2
(45) Date of Patent: Feb. 1, 2005

(54) WEDGE CLUTCH ASSEMBLY

(76) Inventor: Brian K. Bosk, 2211 25th Ave. South, Escanaba, MI (US) 49829

( * ) Notice: Subject to any disclaimer, the term of this patent is extended or adjusted under 35 U.S.C. 154(b) by 2 days.

(21) Appl. No.: 10/317,140

(22) Filed: Dec. 12, 2002

(65) Prior Publication Data
US 2004/0116189 A1 Jun. 17, 2004

(51) Int. Cl.$^7$ .................................................. F16D 7/02
(52) U.S. Cl. ........................................................ 464/43
(58) Field of Search .............................. 464/42, 43, 44; 192/56.6, 56 R; 81/476

(56) References Cited

U.S. PATENT DOCUMENTS

| | | | |
|---|---|---|---|
| 1,895,402 A | * | 1/1933 | Sobey .......................... 464/44 |
| 1,897,322 A | * | 2/1933 | Montgomery ............. 464/43 X |
| 1,936,713 A | | 11/1933 | Freeman et al. |
| 2,236,854 A | * | 4/1941 | Oceansek .................. 464/43 X |
| 2,428,973 A | * | 10/1947 | Kelsey ...................... 464/44 X |
| 2,530,796 A | * | 11/1950 | Weyant ...................... 464/44 X |
| 2,569,144 A | * | 9/1951 | Benson ......................... 464/44 |
| 3,625,292 A | | 12/1971 | Lay |
| 3,648,483 A | * | 3/1972 | Garcia, Jr. ................... 464/43 |
| 3,752,278 A | | 8/1973 | States |
| 4,053,980 A | | 10/1977 | Poehlman |
| 4,066,136 A | | 1/1978 | Wanner et al. |
| 4,606,443 A | | 8/1986 | Kimura |
| 4,809,572 A | | 3/1989 | Sasaki |
| 4,883,130 A | | 11/1989 | Dixon |
| 4,967,888 A | | 11/1990 | Lippacher et al. |
| 5,060,772 A | | 10/1991 | Anders et al. |
| 5,094,133 A | | 3/1992 | Schreiber |
| 5,134,909 A | | 8/1992 | Sasaki |
| 5,138,916 A | | 8/1992 | Sato et al. |
| 5,350,026 A | | 9/1994 | Markus et al. |
| 5,372,206 A | | 12/1994 | Sasaki et al. |
| 5,538,089 A | | 7/1996 | Sanford |
| 5,566,458 A | | 10/1996 | Bednar |
| 5,573,091 A | | 11/1996 | Hung |
| 5,778,989 A | | 7/1998 | Newmaier |
| 6,056,101 A | * | 5/2000 | Kataoka ................ 192/56.6 X |
| 6,283,226 B1 | | 9/2001 | Chen |
| 6,439,091 B1 | | 8/2002 | Dibbern et al. |
| 2002/0062967 A1 | | 5/2002 | Ziegler |

FOREIGN PATENT DOCUMENTS

| | | |
|---|---|---|
| DE | 3807308 | 9/1989 |
| DE | 4101705 | 3/1992 |
| FR | 2799113 | 4/2001 |

* cited by examiner

Primary Examiner—Greg Binda
(74) Attorney, Agent, or Firm—Richard C. Litman

(57) ABSTRACT

Three wedge clutch assemblies for power tools, drilling rigs and like machinery utilizing rotating drills. The first two wedge clutch assemblies comprise a pinion shaft adapted in shape to support sequentially a pinion gear, a bronze clutch cup, an optional bearing, and a steel wedge clutch spring washer retained by a fastener. A third wedge cup assembly is assembled on a modified motor shaft to include a bronze clutch cup adapted to accept a sprocket wheel, and a steel wedge clutch spring washer retained by a fastener.

7 Claims, 6 Drawing Sheets

WEDGE CLUTCH ASSEMBLY

BACKGROUND OF THE INVENTION

1. Field of the Invention

The present invention relates generally to gear systems. More specifically, the invention is a wedge clutch assembly for insertion in power hand tools and drilling apparatus to prevent damage to a gear drive system upon excessive stress.

2. Description of the Related Art

The related art of interest describes various clutch assemblies, but none of the cited references discloses the present invention. There is a need to provide a mechanism to avoid gear failure in power hand tools and even in well drilling apparatus. The relevant art will be discussed in the order of perceived relevance to the present invention.

U.S. Patent Application Publication No. US 2002/0062967 published on May 30, 2002, for Bernd Ziegler describes an electrical hand-held power tool with an electromagnetic safety clutch provided between a pinion shaft and a rotor shaft. The pinion shaft is formed as a hollow shaft provided in its interior with an inner bearing which rotatably supports the pinion shaft. The rotor shaft has its end received in the interior of the pinion shaft and supported against the inner bearing. The safety clutch is distinguishable for requiring an electromagnetic means.

U.S. Pat. No. 3,625,292 issued on Dec. 7, 1971, to Michael T. Lay describes an insulated slip clutch for a power cutting tool such as a lawn edger and grass trimmer. A slip clutch made of Bellville washer springs is held in place by a retaining nut which allows the D-shaped end of the drive shaft to continue to rotate, but to immobilize the drive pinion and any cutting motion. The slip clutch is housed between the cutting blade and a plastic casing in two insulating cups and a liner with a D-shaped hole. The clutch assembly is deemed distinguishable for requiring the driving shaft end to have a flattened D-shaped cross-section, Bellville washer springs and a two-cup insulating casing.

U.S. Pat. No. 4,606,443 issued on Aug. 19, 1986, to Misao Kimura describes a planetary drive with an overload clutch release means for a telescopic antenna comprises an intermediate gear which meshes with a gear portion provided on an inner surface of a driven rotary member and a clutch gear which meshes with the intermediate gear to comprise the planetary gears. The clutch assembly is distinguishable for requiring a planetary drive with an intermediate gear for raising and lowering a telescopic antenna.

U.S. Pat. No. 3,752,278 issued on Aug. 14, 1973, to Ronald F. States describes an improved power operated wrench or screwdriver having two dog clutches in series for the transmission of the drive in which one is a torque sensitive dog clutch having ramped interengaging driving surfaces adapted to be induced to become displaced against the action of a spring when the torque applied by the tool exceeds a predetermined value. The other dog clutch is a non-torque sensitive clutch which is adapted to become disengaged by displacement of the torque sensitive clutch. The dog clutches are distinguishable for requiring two having different torque sensitivities.

U.S. Pat. No. 4,053,980 issued on Oct. 18, 1977, to Arthur G. Poehlman describes a chain saw including an overtorque releasing clutch mechanism comprising a drive member driven by the drive shaft and a driven member for rotating the chain sprocket. One of the members is axially movable relative to the other between an engaged or driving position and a released position wherein they are disengaged from each other. The drive and driven members have intermeshing clutch teeth which coact to produce an axial force in a direction tending to separate the members which are releasably held by a resilient member. The clutch mechanism is distinguishable for requiring intermeshing clutch teeth.

U.S. Pat. No. 4,066,136 issued on Jan. 3, 1978, to Karl Wanner et al. describes a torque and impulse transmitting portable hammer drill having a safety overload clutch mechanism inserted in series between the rotary shaft of the motor and the tool to terminate the transmission of torque from the rotary shaft to the tool when resistance to rotation exceeds a predetermined value. An intermediate gear with smaller teeth is positioned between the crank gear and the coupling gear. The clutch is distinguishable for requiring a third gear.

U.S. Pat. No. 4,809,572 issued on Mar. 7, 1989, to Katsuhiko Sasaki describes a power driven screwdriver having a claw clutch comprising a fixed clutch member with teeth on the end of a main gear on a support shaft. The spindle has a movable clutch member with teeth and an engaging ball in an inclined groove. A spring is located between the movable clutch member and the fixed clutch member. The claw clutch is distinguishable for requiring engaging teeth and an engaging ball.

U.S. Pat. No. 4,883,130 issued on Nov. 28, 1989, to Paul H. Dixon describes a rotating dual speed transmission for a screw fastener driving tool of an automatic assembly machine which acts in conjunction with two torque-responsive clutches to tighten a threaded fastener such as a screw or a nut during rotation of the spindle. A first torque-responsive clutch automatically switches the drive from a fast speed to a slow speed when torque of a predetermined magnitude is imposed on the fastener, and a second torque-responsive clutch automatically interrupts the drive to the fastener when torque of a higher predetermined magnitude is imposed on the fastener. The first lower clutch has lugs which lock with the lower cam segments supported with a coil spring around the spindle. The upper clutch has lugs which lock with the jaw members of the lower clutch. The clutches are distinguishable for requiring locking elements such as lugs and cam segments.

U.S. Pat. No. 4,967,888 issued on Nov. 6, 1990, to Wolfgang Lippacher et al. describes a safety clutch for a motor-driven hammer drill which breaks the rotational drive train when a working tool becomes seized in a receiving material. A pair of coupling balls upon seizure leave their recesses in the power take-off spindle housing to permit the drive to continue to rotate. However, the motor must be stopped and restarted. The safety clutch assembly is distinguishable for requiring coupling balls.

U.S. Pat. No. 5,060,772 issued on Oct. 29, 1991, to Heinz-Gerhard Anders et al. describes a pneumatic power-operated screw driving tool which includes a switching clutch to transfer the torque from the drive shaft to an output shaft when the tool seizes. The driver has a first clutch having clutch coupling jaws at its end which engages the coupling jaws of the second clutch. The clutch system is distinguishable for requiring two engaging clutches with jaws.

U.S. Pat. No. 5,094,133 issued on Mar. 10, 1992, to Wolfgang Schreiber describes a power-operated screwdriver with a switch-off means for screw-in depth and screw-in torque having three clutch elements. A first clutch element arranged between the drive and the tool drive shaft, and transferrable by axial displacement of the tool drive shaft from a rest position to a working position. A second clutch element connected to the tool drive shaft. A third clutch element arranged between the first and second clutch elements forms an entrainment clutch with the first clutch element and forms a release clutch with the second clutch element. The clutch system is distinguishable for requiring three connecting clutches.

U.S. Pat. No. 5,134,909 issued on Aug. 4, 1992, to Katsuhiko Sasaki describes a power driven screwdriver including a driving or frictional clutch mechanism interposed between the drive motor and the spindle. A claw clutch mechanism is interposed between the spindle and a second driving member which is separated from a first driving member. The clutch system is distinguishable for requiring a frictional clutch and a claw clutch.

U.S. Pat. No. 5,138,916 issued on Aug. 18, 1992, to Yuichi Sato et al. describes a power operated screwdriver having two clutches, a compression spring between a support shaft and an intermediate clutch disc and urges the clutch disc toward the main spindle to disengage the first clutch. The clutch system is distinguishable for requiring two clutches.

U.S. Pat. No. 5,350,026 issued on Sep. 27, 1994, to Heule Markus et al. describes an electric power-driven screwdriver having a single friction coupling consisting of first and second coupling elements that undoes the drive connection between a driving electric motor and the tool output shaft.

U.S. Pat. No. 5,372,206 issued on Dec. 13, 1994, to Katsuhiko Sasaki et al. describes a tightening tool including a drive member rotatably driven by a motor. An intermediate member is interposed between the drive member and a spindle, and rotatable with the drive member. A claw clutch is formed between the spindle and the drive member. The clutch system is distinguishable for requiring a claw clutch.

U.S. Pat. No. 5,538,089 issued on Jul. 23, 1996, to Christopher P. Sanford describes a power tool clutch assembly having a first spindle configured to rotate in a gear case. A drive clutch element is fixed to the first spindle. A second spindle rotates independently of the first spindle. An output clutch element is fixed to the second spindle. A compression spring is provided between the intermediate and output clutch elements. The clutch housing and clutch components can be removed from a power tool gear casing for easy service. The clutch assembly is distinguishable for requiring two clutches.

U.S. Pat. No. 5,566,458 issued on Oct. 22, 1996, to Thomas R. Bednar describes two embodiments of a clutch mechanism for reciprocating saws having a wobble plate drive member including a spindle reciprocally supported by the housing, and a clutch drivingly connecting the motor to the shaft and providing slippage between the motor and the shaft if there is binding of the spindle. The clutch mechanisms are distinguishable for requiring structurally different elements.

U.S. Pat. No. 5,573,091 issued on Nov. 12, 1996, to Michael Hung describes an electrically powered or manually driven clutch and brake assembly for an electric winch cooperating with a transmission assembly. The clutch mechanism is provided with a thrust bearing on a clutch shaft, and a large clutch gear is inserted thereon. A lining plate is attached to a clutch plate of the large gear, and a pinion gear is attached tightly to the lining plate. Another thrust bearing is placed behind the pinion gear and a compression spring is inserted on the clutch shaft. The large gear and the pinion gear are pushed tightly together or loosened as a function of the resiliency of the spring. A clutch hand wheel can be provided for manual operation. The clutch mechanism is distinguishable for requiring a large clutch gear, a lining plate and two thrust bearings.

U.S. Pat. No. 5,622,230 issued on Apr. 22, 1997, to David A. Giardino et al. describes a rotary impact wrench clutch comprising a two-part, readily assembled and disassembled pin cage-coupler. One part is a cylindrical, longitudinally grooved cage contains a clutch mechanism and capped at one end by a lobed end plate coupler. The clutch device is distinguishable for requiring a pin-cage coupler.

U.S. Pat. No. 5,778,989 issued on Jul. 14, 1998, to Anton Neumaier describes a manually operable screw driving tool having a drive pinion axially fixed with a housing. A spindle in the housing is axially displaceable relative to the drive pinion against the force of a first spring. A clutch element is located in a passageway in a collar on the drive pinion, and is radially displaceable by an actuating member for engaging the spindle to the drive pinion. In the engaged position the clutch element sits against a stop surface in the spindle. The actuation member is axially displaceable by stops located on the spindle, and can be axially fixed to the drive pinion by a retaining element and a snap-element. The clutch element is distinguishable for requiring an actuation member axially displaceable by stops on the spindle.

U.S. Pat. No. 6,283,226 B1 issued on Sep. 4, 2001, to Kenneth Chen describes a clutch-buffer assembly for a power wrench comprising a driven wheel having an outwardly positioning tube disposed at a power-input end. A retaining spring, a retaining disc, a driven gear, an anchor ring, and a reversible motor are collared onto the positioning tube sequentially. The retaining disc is limited to move back and forth along the positioning tube without rotation. A pair of protruding teeth and reception cavities in respective contact faces of the retaining disc and the driven gear, and the reversible motor is used to drive the driven gear. When the driven wheel rotates at a higher speed, the retaining disc can be detached from the driven gear for control of the power consumption to lessen the imposed load in order not to blow a fuse. The clutch-buffer assembly is distinguishable for requiring a pair of protruding teeth and reception cavities in the respective contact faces of the retaining disc and the driven gear.

U.S. Pat. No. 6,439,091 B1 issued on Aug. 27, 2002, to John E. Dibbern et al. describes a clutch mechanism for a power tool having a hole and first and second clamps connected to the arbor to clamp the blade. One of the cutting tool and at least one of the first and second clamps and arbor have a first drive surface for contacting a second drive surface on the other of the cutting tool, and at least one of the first and second clamps and arbor. The second drive surface is movable between a first position and a second position bypassing the first drive surface. The second drive surface is resiliently connected to the other of the cutting tool and at least one of the first and second clamps and arbor. At least one metal strip connects the second drive surface to the other of the blade and at least one of the first and second clamps and arbor. The clutch mechanism is distinguishable for requiring two clamps for the blade and first and second drive surfaces.

German Patent Application No. DE 38 07 308 A1 published on Sep. 14, 1989, for Wilhelm Geis et al. describes a radially acting safety friction clutch positioned inside a component of a power tool with an axial mode of action to obtain a shorter and more compact tool. The clutch has compression or cup springs. The clutch is distinguishable for requiring a radially acting safety friction clutch assembly.

German Patent Application No. DE 41 01 705 A1 published on Mar. 26, 1992, for Rainer Warnicki et al. describes a positive, frictionless clutch for a hedge trimmer which has a locking ring to disengage the main gear from a driven bushing by moving two drive rollers into a clear space. The clutch assembly comprises a main drive gear, the driven bushing and a locking ring mounted co-axially on a fixed central shaft. One end of the drive bushing has eccentrics which drive the trimmer blades. Roller located in apertures of the driven bushing transmit the drive through ledges on the inside diameter of the main drive gear. When the trimmer handlegrips are released a stop pin enters a hole in the flange of the locking ring and prevents rotation. The main drive gear and the driven bushing continue rotating, causing the rollers to enter a clear space between the two members and immediately disengaging the drive. A preloading coil spring connects the locking ring to the driven bushing, and together with friction brings the trimmer blades to rest. The clutch assembly is distinguishable for requiring an eccentric drive bushing containing two rollers.

France Patent Application No. 2 799 113 published on Apr. 6, 2001, for Yves Bonin describes a jointed dental hand drill as a continuously rotating instrument having a torque limiter in the form of a spring-loaded sliding gear clutch on the primary drive shaft and a fixed gear on the secondary drive shaft. In the event of a set torque being exceeded, the sliding gear moves along the primary shaft against the pressure of the spring and disengages the transmission. The two gears have asymmetrical teeth to give different torque levels according to the direction of motion. The dental drill clutch system is distinguishable for requiring asymmetrical gear teeth on two gears.

None of the above inventions and patents, taken either singularly or in combination, is seen to describe the instant invention as claimed. Thus, a wedge clutch assembly solving the aforementioned problems is desired.

SUMMARY OF THE INVENTION

The present invention is directed to three embodiments of a wedge clutch assembly requiring a minimum of space for inclusion in any electric or pneumatic power tool and drilling rig to prevent damage to an electrically powered rotary or reciprocal hand drill, screwdriver, well drill, and the like tool or apparatus. The first embodiment utilizes the wedge clutch assembly on a pinion or drive shaft having a configuration sequentially as a first small diameter and a proximate threaded region, a second conical region increasing in diameter, a third increased diameter region, a fourth gear region, and a fifth decreased diameter region, whereby the pinion gear revolves with the driven pinion shaft. A steel clutch wedge spring washer is positioned adjacent the pinion gear; and a retaining nut threaded on the proximate threaded region for retaining said steel clutch wedge spring washer; whereby the pinion gear revolves with the driven shaft. A clutch cup is inserted on the conical enlarged region of the pinion shaft and inside the pinion gear. The second embodiment utilizes a pinion gear having a throughbore with inclined sides; a cylindrical pinion shaft having a conical enlarged region proximate to a first end thereof for supporting said pinion gear and a second end having a threaded region; and a bearing spacer element, a bearing, a clutch wedge spring steel washer, and a retaining nut sequentially secured on said threaded region of the pinion shaft; whereby the pinion gear revolves with the driven pinion shaft. A third embodiment utilizes a driven cylindrical motor shaft; a clutch cup having a first enlarged region adapted with a keyway for passing said motor shaft therethrough; the clutch cup having a second conical reduced region and a third externally threaded neck region; a sprocket wheel frictionally fitted on the second conical reduced region of the clutch cup; a steel clutch wedge spring washer positioned adjacent said sprocket wheel; and a nut retaining the steel spring washer on the motor shaft; whereby the wedge clutch assembly revolves with the motor shaft.

Accordingly, it is a principal, object of the invention to provide a wedge clutch assembly for hand tools and drilling rigs according to the present invention.

It is another object of the invention to provide a wedge clutch assembly incorporating as a key element a clutch wedge spring washer according to the present invention.

It is a further object of the invention to provide a wedge clutch assembly incorporating as another key element a clutch cup according to the present invention.

Still another object of the invention is to provide a wedge clutch assembly adaptable to several different pinion and drive shafts.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to three embodiments of a wedge clutch assembly which can be utilized in rotatable electrically or pneumatically driven machinery such as hand tools and drilling rigs which would prevent expensive broken gear damage.

Figure 1:
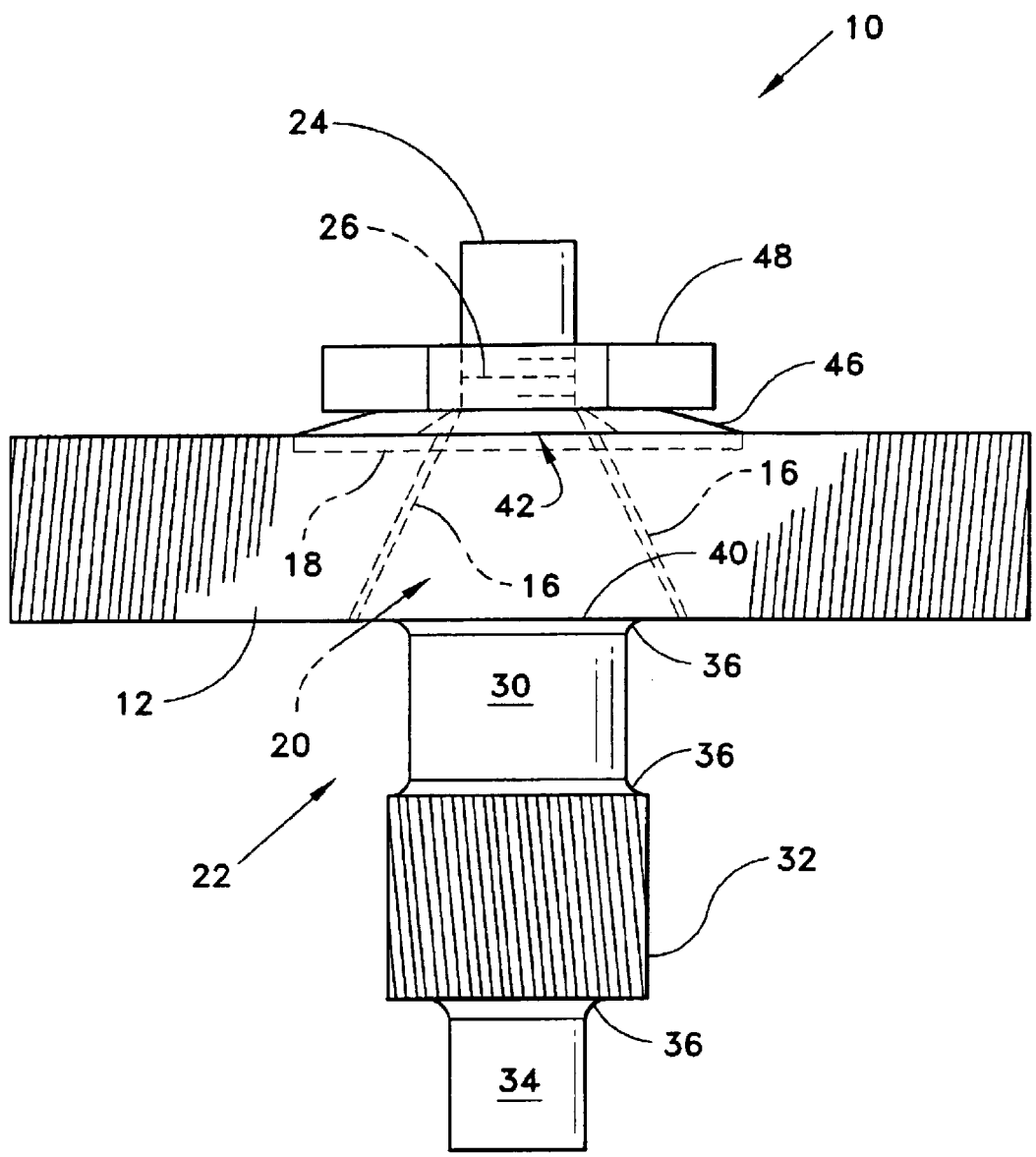
FIG. 1 is a schematic elevational view of a first embodiment of a wedge clutch assembly for installation in a hand tool or a drilling rig according to the present invention.
Figure 2:
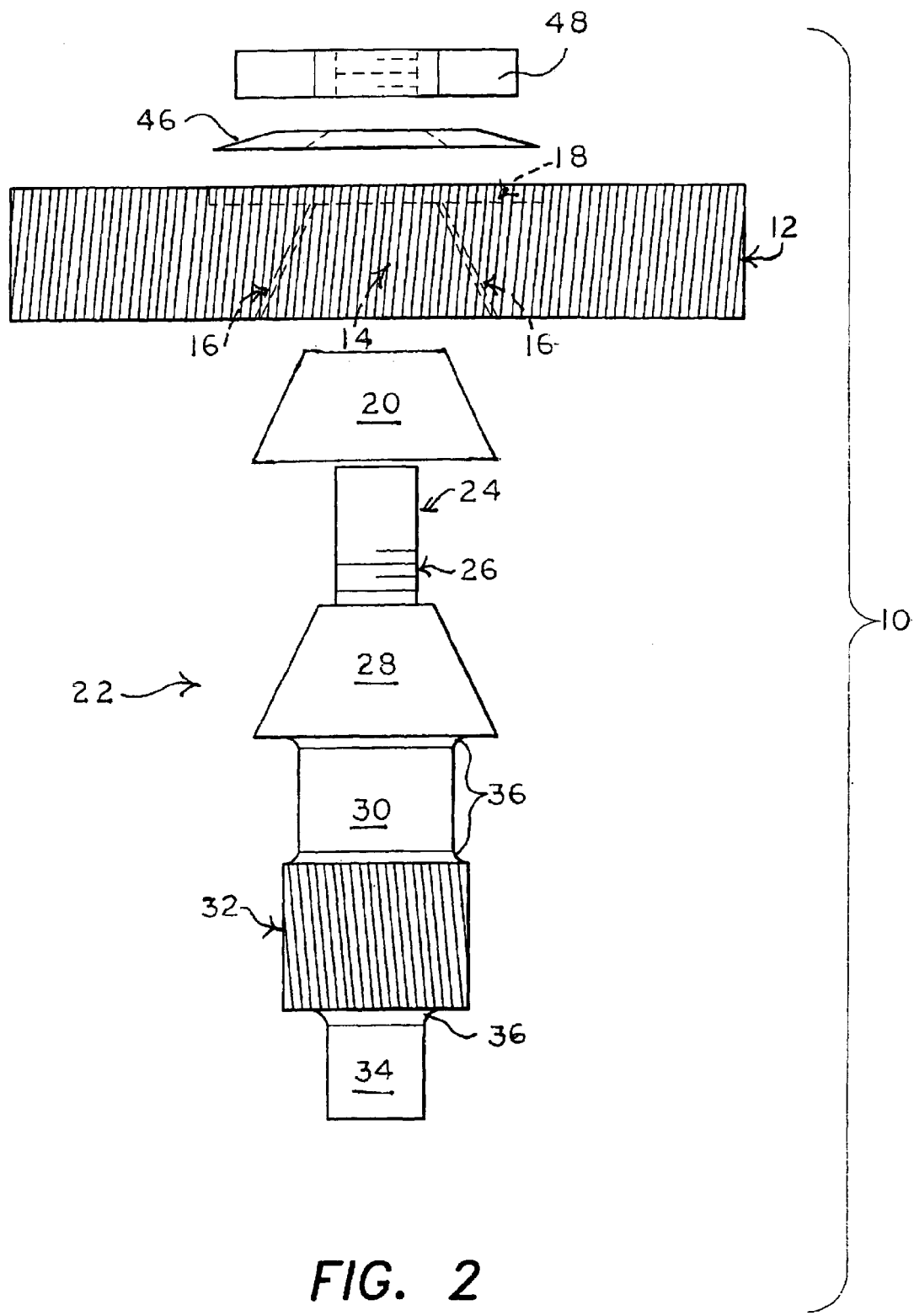
FIG. 2 is an exploded elevational view of the FIG. 1 wedge clutch assembly according to the present invention.

A first embodiment 10 of a wedge clutch assembly is illustrated in FIGS. 1 and 2. A pinion gear 12 has a throughbore 14 with inclined sides 16 to define a frustoconical configuration and a countersink 18 on its upper surface to frictionally accommodate an inverted bronze clutch cup 20 having a frustoconical configuration. A cylindrical pinion drive shaft 22 has in sequence from the top, a first small diameter neck 24 and a proximate threaded region 26, a second frustoconical region 28 increasing in diameter, a third increased diameter region 30, a fourth gear region 32, and a fifth decreased diameter region 34; whereby the pinion gear 12 revolves with a pinion gear of a driven shaft. Fillets 36 are provided to support the frustoconical region 28 on one side and both sides of the gear region 32. The frustoconical bronze clutch cup 20 is 1/16 inch thick (shown also in FIG. 6) and has a wide aperture 40 and a smaller aperture 42. The bronze clutch cup 20 is inserted inside the throughbore 14 of the pinion gear 12 and fits over the frustoconical region 28 of the pinion drive shaft 22 to prevent the pinion gear 12 and the pinion drive shaft 22 from gouging a clutch wedge spring washer 46 shaped as a shallow cup with open ends. On the smaller aperture 42 of the clutch cup 20 and inside the counter-sink 18, the clutch wedge spring washer 46 made of spring steel is placed. A fastener such as a retaining nut or jam nut 48 on the externally threaded region 26 secures and adjusts the sensitivity of the clutch wedge spring washer 46 in the countersink 18 to a specific applied torque on the drive shaft of the tool which will energize the clutching action to eliminate any damage to the mechanical drive system of the tool. The clutch wedge spring washer 46 collapses on excessive torque applied to the main drive system to permit the pinion gear 12 and the pinion drive shaft 22 to spin freely under an excessive load. This principle applies to all of the embodiments.

Figure 3:
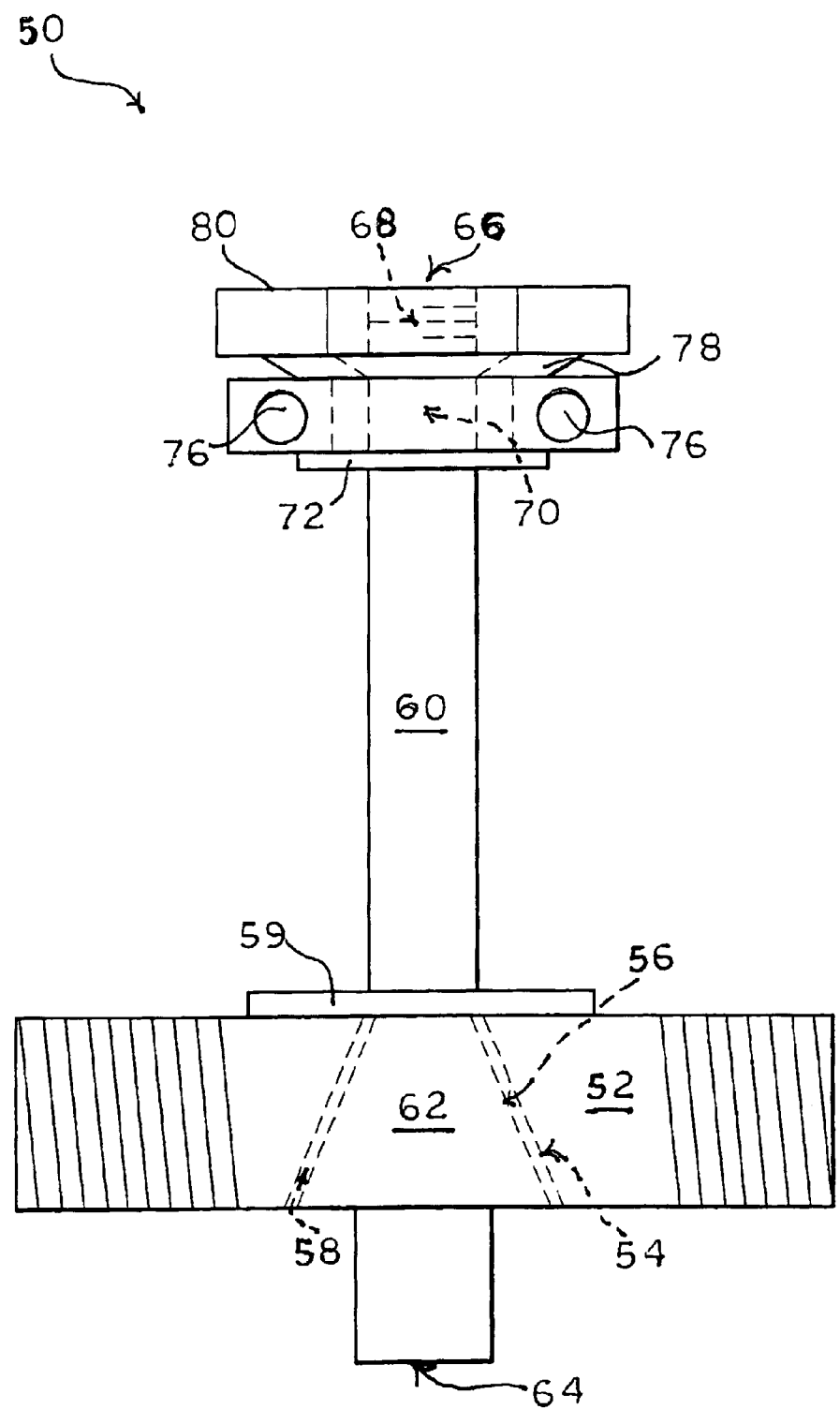
FIG. 3 is a schematic elevational view of a second embodiment of a wedge clutch assembly for installation in a hand tool or a drilling rig according to the present invention.
Figure 4:
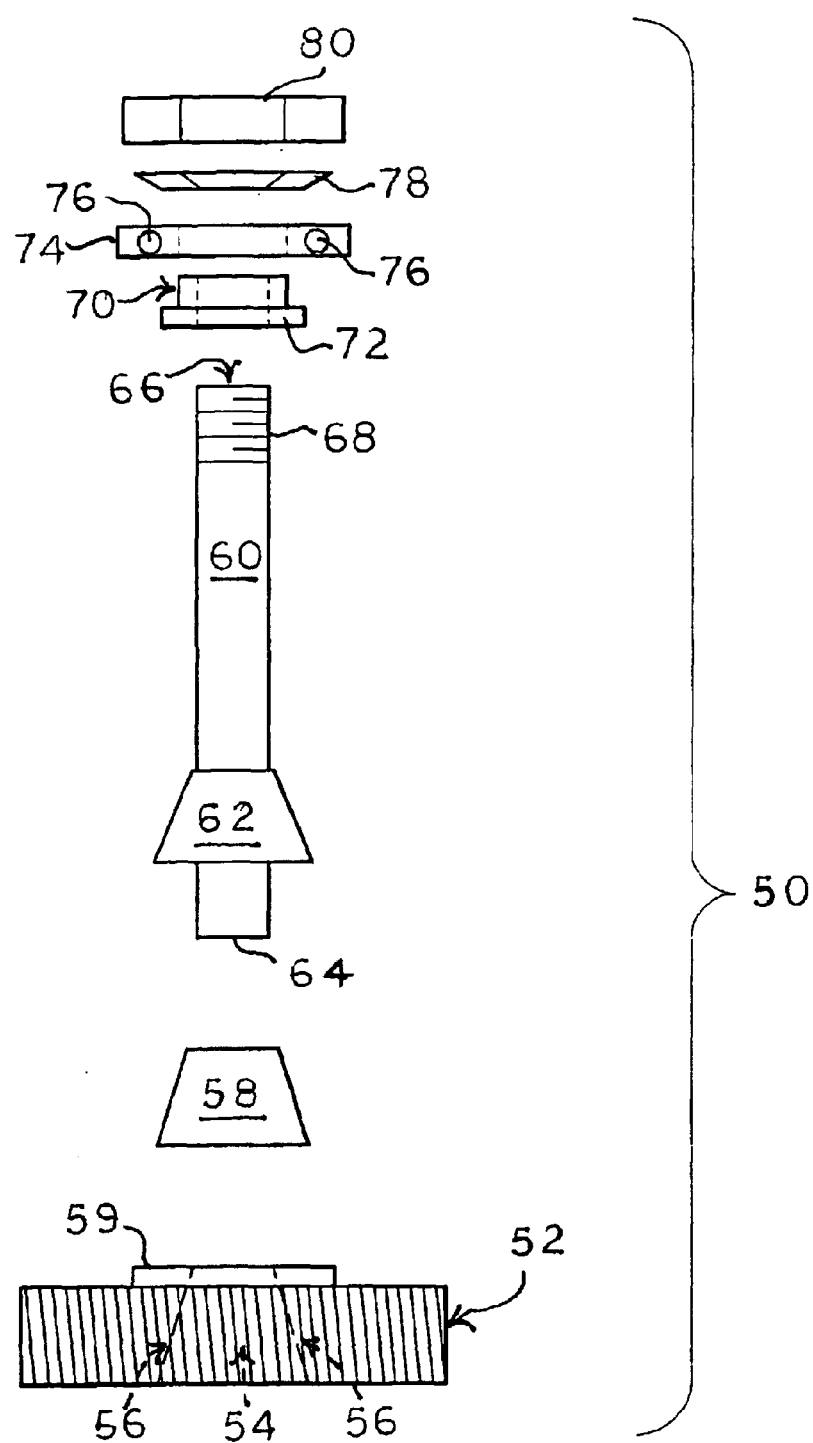
FIG. 4 is an exploded elevational view of the FIG. 3 wedge clutch assembly according to the present invention.

FIGS. 3 and 4 depict a second embodiment of a wedge clutch assembly 50 comprising a pinion gear 52 having a conical throughbore 54 with inclined sides 56 for accepting a bronze clutch cup 58. The pinion gear 52 has a reinforcement ring 59 on the smaller opening of the throughbore 54. A cylindrical pinion shaft 60 has a conical enlarged region 62 proximate to a first end 64 thereof for supporting the pinion gear 52 and a second end 66 having an externally threaded region 68. A bearing spacer element 70 with a shoulder 72 supports a bearing 74 with evenly spaced blind bores 76, a steel clutch wedge spring washer 78 which is inverted, and a retaining jam nut 80 sequentially secured on the threaded region 68 of the pinion shaft 60, whereby the pinion gear 52 revolves with a pinion gear of a driven shaft (not shown). Again, the sensitivity of the clutch wedge spring washer 78 is adjusted by the amount of pressure exerted by the jam nut 80. Upon excessive torque on the driven shaft due to sticking in a bore, the clutch wedge spring washer 78 will compress to disengage the pinion gear 52 from the driven gear to avoid damage to the driving system of the tool.

Figure 5:
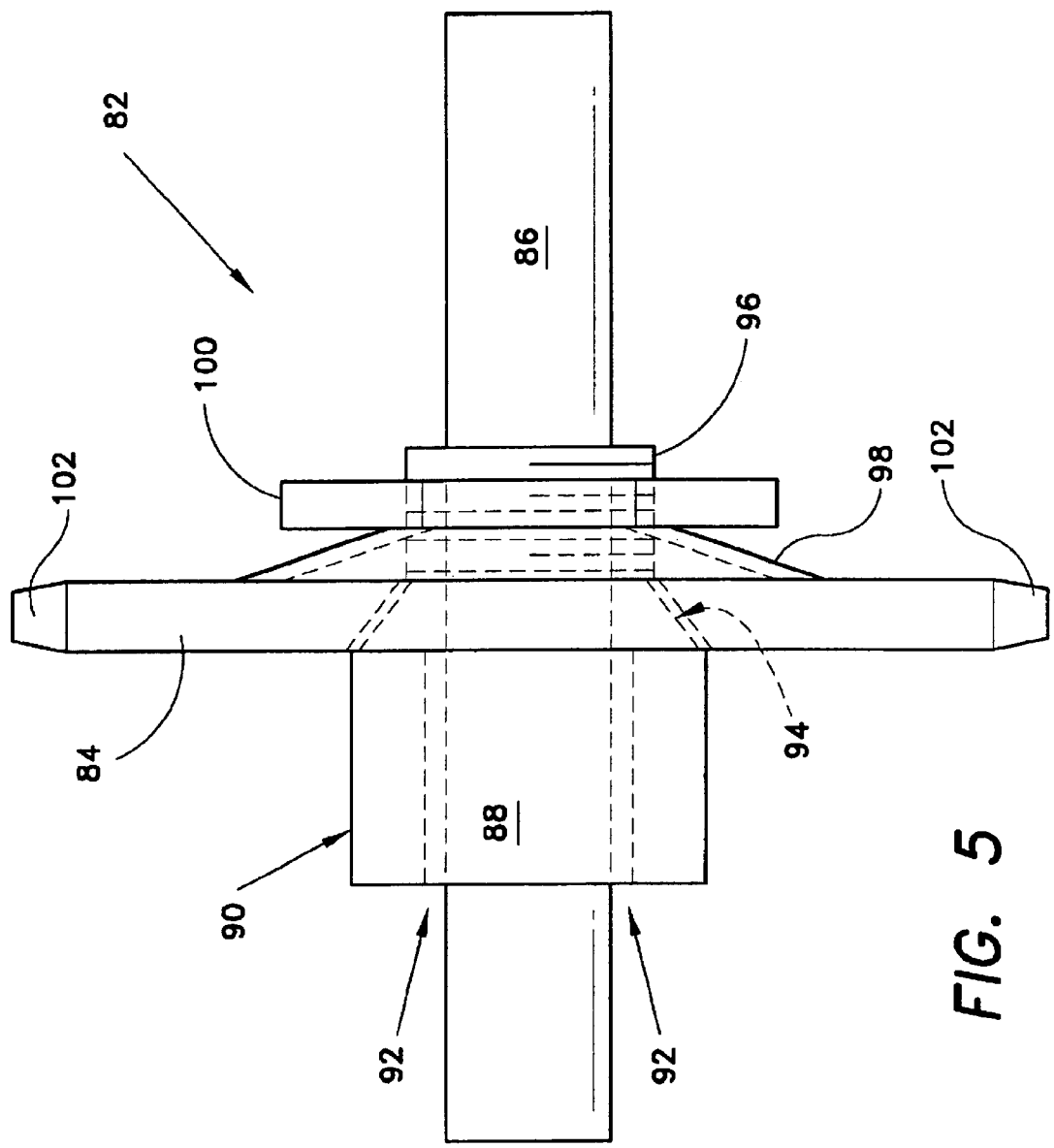
FIG. 5 is a schematic elevational view of a third embodiment of a wedge clutch assembly for installation in a hand tool or a drilling rig according to the present invention.

FIG. 5 shows a third embodiment 82 of a wedge clutch assembly for a sprocket drive wheel 84 having cogs 102 on a driven cylindrical motor shaft 86. A bronze clutch cup 88 is provided with a first enlarged region 90 adapted with a keyway 92 for passage of the motor shaft 86 therethrough. The clutch cup 88 has a second conical reduced region 94 and a third externally threaded neck region 96. The driven sprocket wheel 84 is frictionally fitted on said second conical reduced region 94 of the clutch cup 88. A steel clutch wedge spring washer 98 is positioned abutting the driven sprocket wheel 84, and its sensitivity is adjustably maintained by a jam nut 100 on the threaded neck region 96. Thus, the driven sprocket wheel 84 is protected from damage by the efficient operation of the steel clutch wedge spring washer 98 on the motor shaft 86.

Figure 6:
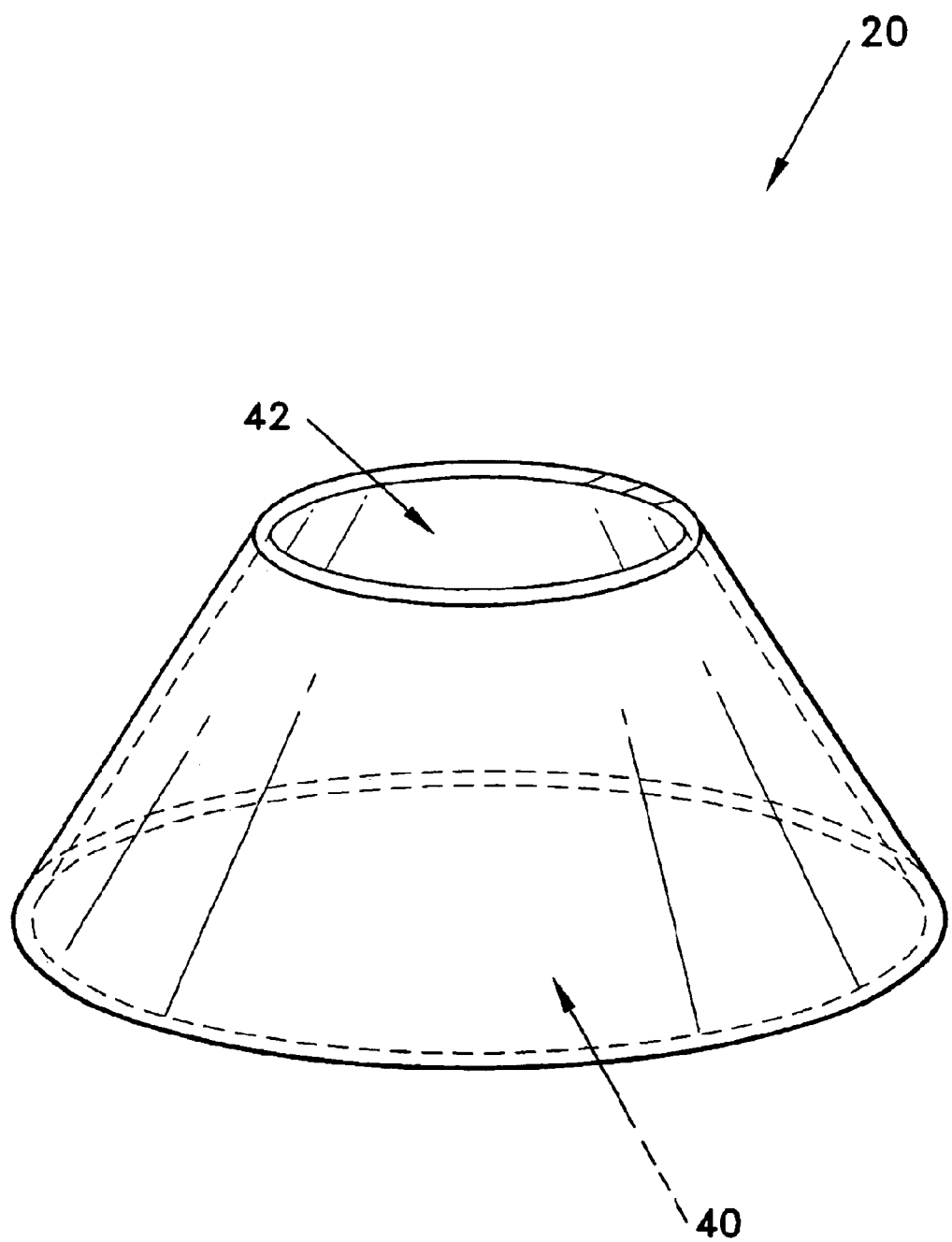
FIG. 6 is a perspective view of the FIG. 5 wedge clutch cup according to the present invention.

FIG. 6 illustrates a bronze clutch cup 20 used in the first two embodiments having a wide lower aperture 40 and a narrow upper aperture 42 to define a frustoconical configuration. The clutch cups have a peripheral thickness of 1/16 inch. As noted above, the clutch cup 20 is the only element in the wedge clutch assemblies made of bronze, the remaining elements are made of hardened steel.

It is to be understood that the present invention is not limited to the embodiments described above, but encompasses any and all embodiments within the scope of the following claims.

What is claim is:

1. A wedge clutch assembly comprising:

a pinion gear having a top surface and a bottom surface, said pinion gear defining a centrally disposed throughbore having a frustoconical configuration;

a wedge clutch spring washer centrally disposed on the top surface of said pinion gear;

a bronze clutch cup having a frustoconical configuration and defining an upper aperture and a lower aperture, wherein the lower aperture is substantially larger than the upper aperture, said clutch cup being inserted within the throughbore of said pinion gear;

a cylindrical pinion shaft including:

an upper externally threaded neck extending through the throughbore and protruding from the top surface of said pinion gear;

a frustoconical section adjacent said threaded neck, said frustoconical section being dimensioned to fit within said clutch cup;

an increased diameter section depending from said frustoconical section and extending below the bottom surface of said pinion gear, said increased diameter section having a diameter substantially greater than the diameter of said upper neck;

a gear section adjacent said increased diameter section; and a decreased diameter section having a diameter substantially less than the diameters of said increased diameter section and said gear section; and a fastener threaded on said upper neck and engaging said wedge spring washer for adjusting an applied torque to a drive shaft of a tool.

2. The wedge clutch assembly according to claim 1, wherein the top surface of the pinion gear defines a centered countersink, said wedge clutch spring washer being disposed within said countersink.

3. The wedge clutch assembly according to claim 1, wherein said wedge clutch spring washer is made of steel.

4. The wedge clutch assembly according to claim 1, wherein said pinion gear and said pinion shaft are made of hardened steel.

5. The wedge clutch assembly according to claim 1, wherein said bronze clutch cup has a thickness of 1/16 inch.

6. The wedge clutch assembly according to claim 1, wherein said fastener is a jam nut.

7. The wedge clutch assembly according to claim 1, wherein the wedge spring washer collapses and the pinion gear and pinion shaft are allowed to rotate freely when the drive shaft of the tool is subjected to excessive torque.

* * * * *